United States Patent [19]
Miragliotta

[11] 3,905,694
[45] Sept. 16, 1975

[54] SLIDE PROJECTOR AND FEED ARRANGEMENT THEREFOR

[76] Inventor: Vito Miragliotta, 1184 S. 1000 E., Clearfield, Utah 84015

[22] Filed: Mar. 4, 1974

[21] Appl. No.: 442,318

[52] U.S. Cl................................. 353/108; 353/120
[51] Int. Cl.².................... G03B 23/08; G03B 23/12
[58] Field of Search............. 353/108, 109, 110, 95, 353/96, 120

[56] References Cited
UNITED STATES PATENTS

| | | | |
|---|---|---|---|
| 1,072,861 | 9/1913 | Koike | 353/109 |
| 2,485,709 | 10/1949 | Davock | 353/95 |
| 2,897,721 | 8/1959 | Cohn | 353/109 |

FOREIGN PATENTS OR APPLICATIONS

| | | | |
|---|---|---|---|
| 1,234,223 | 10/1960 | France | 353/109 |

*Primary Examiner*—Richard E. Aegerter
*Assistant Examiner*—A. J. Mirabito
*Attorney, Agent, or Firm*—K. S. Cornaby

[57] ABSTRACT

A slide projector intended to be manufactured from inexpensive components, incorporating tray sections arranged to telescope within the housing of the projector to present a solid side wall surface for transport and storage that are easily released to expose a stacked train of linked slide mounts in one tray section with the other tray section intended to receive as a stack the linked slides after they have been moved by a feed mechanism over a light source. The feed mechanism preferably involves a cage having four sides each side having a tracking lug extending outwardly therefrom that will engage a notch formed in a side of each slide mount of the train of slide mounts. The individual tracking lug engages the notch in an individual slide mount drawing that mount across a light source that passes light through a slide arrangement therein, through a reflective means, that light finally passing into and through a lens that projects the image on the film portion of the slide onto a screen surface. Additional to the slide projector and feed mechanism therefor, the present invention includes the train of slide mounts and linking arrangement therefore, whereby the slide mounts will fold naturally into a stack after passage across the light source.

5 Claims, 6 Drawing Figures

SLIDE PROJECTOR AND FEED ARRANGEMENT THEREFOR

BRIEF DESCRIPTION OF THE INVENTION

1. Field of the Invention

This invention relates to a slide projector, a unique feed mechanism therefor, and an arrangement of a train of slide mounts for use in said projector.

2. Prior Art

While numerous devices have heretofore been known and in common use for projecting an image from a film strip or slide none have, prior to the present invention, provided the simplistic projector design or connected slide mount arrangement of the present invention.

Certainly devices have long been known for projecting images from a film onto a surface, such devices as shown in early U.S. Pat. Nos. 552,663 and 556,531 have even involved arrangements of slides joined in end to end relationship. The slide arrangement of U.S. Pat. No. 556,531 appears similar to the slide mount arrangement of the present invention, the connected slides therein even stacking on top of one another after passage through the projector. Unlike the slide mount arrangement of the present invention however, the aforesaid arrangement does not involve coupling the slide mount edges in butting alignment by adhesive strips applied to opposite faces of adjacent butting slide mount edges, as does the present invention. In the aforesaid patent, stacking of the linked slides is accomplished by contact with a beveled-faced block or projection that the linked slides contact after passage through the projector. The slide mount arrangement of the present invention, because of the opposite face edge connection thereof provides for a folding of the sides thereof oppositely, so as to stack one on top of another when the slides, descending vertically, contact a horizontal surface.

A later U.S. Pat. No. 2,704,486, also discloses a chain arrangement of slides, shown therein as an endless chain. While the concept of moving slides over a viewing area is somewhat like that of the present invention, the connection arrangement is not, the slides thereof being linked between mid points of the edges thereof.

Additional to the linking arrangement of the slides and the compact design of the projector of the present invention, which are unlike any like arrangement or device within my knowledge, the present invention also employs a unique cage feed mechanism therewith arranged to be manually operated to engage and move each slide, in turn, over a light source. The light source, because of the unique arrangement of the cage feed mechanism shines unhampered therethrough and through the film portions of the slide within the mount. While feed mechanisms that allow for an unhampered light passage from a light source are not necessarily new, with such a feed mechanism, arranged as a drum mechanism being shown in U.S. Pat. No. 1,097,013, a cage feed like that of the present invention is unlike any other feed means within the knowledge of the inventor.

SUMMARY OF THE INVENTION

It is a principal object of the present invention to provide a simplistic and inexpensively produced slide projector that can be easily manufactured from cheap materials, which slide projector can be safely operated by even young persons.

Another object is to provide a slide projector having tray sections therefor that can be positioned with solid wall surfaces thereof facing outwardly for transport and storage, which trays can be reversed for use to expose a stacked train of slide mounts in one tray section with the other tray section intended to receive as a stack the train of mounts after passage through a viewing portion of the projector.

Another object is to provide a simple but efficient feed mechanism whereby each slide mount in the train of slide mounts, in turn, is moved through a viewing area whereat light from a light source passes through a film portion of the slide, ultimately traveling into and through a lens focusing the image on the film onto a screen surface.

Still another object is to provide a feed mechanism capable of reliably moving a slide mount of the train of slide mounts, across a viewing area by appropriate rotational movements thereof, which feed mechanism is arranged to allow passage of light therethrough and through the film portion of the slide.

Still another object is to provide a train of slide mounts coupled individually to one another along the edges thereof such that, when the train of slide mounts is lowered vertically each slide mount, in turn, folds oppositely to the following, folding thereby over one another to form a stack of slide mounts.

Principal features of the present invention include a housing formed of light in weight inexpensive material wherein can optionally be arranged a fan means for maintaining a desired temperature therein when a lamp in the projector is illuminated. A folding handle is preferably included with the projector to facilitate transport thereof. Also included therewith is a hinged lens assembly. The lens assembly consisting of a housing, mirror and lens, is intended to be capable of rotating upwardly out of the way to facilitate arranging a slide mount of a train of slide mounts over a magazine portion of the projector. The lens assembly contains also spaced slide mount guides extending from opposite sides of the bottom thereof.

The magazine portion already mentioned herein consists of a tower wherein a cage feed mechanism is rotatably arranged to be manually turned to move each slide mount, in turn, into the viewing area. The train of slide mounts is moved between tray sections. The train of slide mounts moves from a stacked attitude in one tray section into a stack in the other. The tray sections are reversible, in one attitude, for storage and transport presenting flat outer surfaces, but can be reversed and telescoped in this the projector housing to expose the stack of slide mounts in one and the receiving cavity in the other. Within the magazine portion is arranged a mirror for receiving light from a projector lamp and to direct that light through the cage feed mechanism and a slide mount thereof. The cage feed mechanism is mounted between pins on the magazine so as to leave an unobstructed passage for light therethrough.

The cage feed mechanism is preferably formed as a box frame, each side thereof having a tracking lug that projects outwardly from the one edge of each box side, from approximately the mid point thereof.

Each tracking lug, as the cage is rotated, is, in turn, intended to intersect and pass into a notch formed in one side of a slide mount, adjacent edges of which slide mount are jointed, at the edges, to like slide mounts forming the train of slide mounts.

The train of slide mounts of the present invention additional to being notched appropriately, as described above, are connected uniquely so as to stack automatically into a pile when lowered vertically onto a flat surface. This stacking quality is effected by the method of joined the slide mounts into the train involving applying tape or a like adhesive substance to opposite faces of butting edges of adjacent slide mounts in the train, forming thereby oppositely operating hinge connections of the slide mounts into the train. The opposite hinge connection of which slide mounts, along with appropriately camfering the slide mount edges facilitates the slide mounts in forming into a stack when lowered vertically into the waiting tray section.

Further objects and features of the invention will become apparent from the following detailed description, taken together with the accompanying drawings.

THE DRAWINGS

FIG. 1 is a profile perspective view of the projector of the present invention taken from a left hand corner of the front of the projector, showing a lens assembly thereof rotated out of engagement with a train of slide mounts arranged therein;

FIG. 2, a fragmented view showing the upper portion of the projector of FIG. 1 broken off from the bottom portion thereof, with the lens assembly rotated to an operating position engaging a slide mount of the train of slide mounts of FIG. 1;

FIG. 3, a sectional view taken along the line 3—3 of FIG. 2, exposing a lateral cross section of the lens assembly, a slide mount cage feed mechanism, and a fan means for cooling a projector lamp;

FIG. 4, a sectional view taken along the line 4—4 of FIG. 2, exposing a longitudinal cross section of the lens assembly, a projector lamp, and the slide mount cage feed mechanism;

FIG. 5, a top plan view of the slide train; and

FIG. 6, a side elevation view of the slide train of FIG. 5.

DETAILED DESCRIPTION

Figure 1:
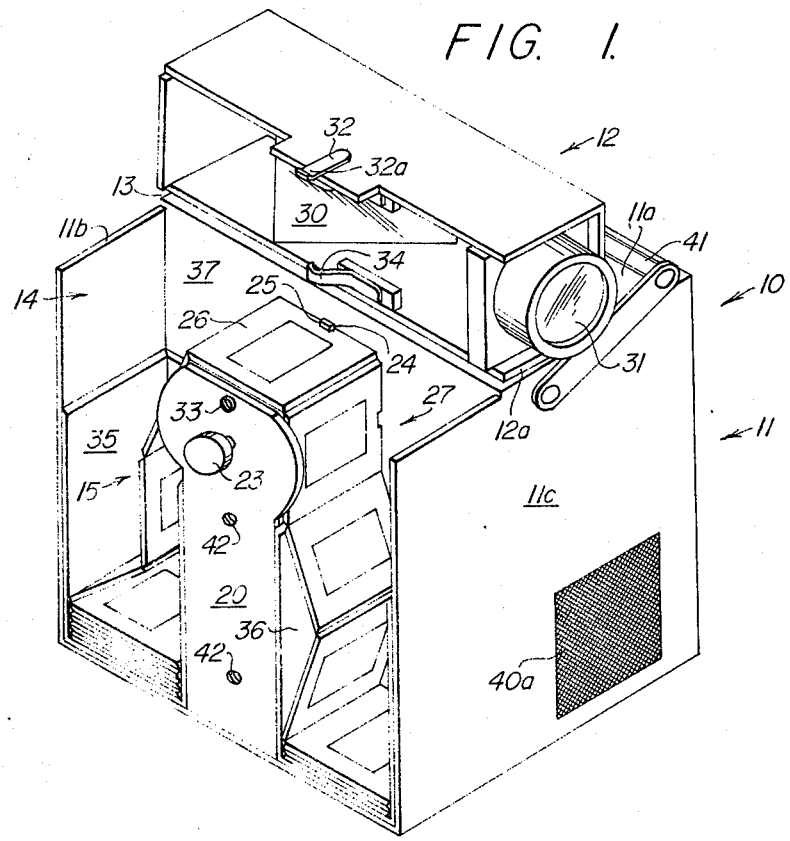
Figure 2:
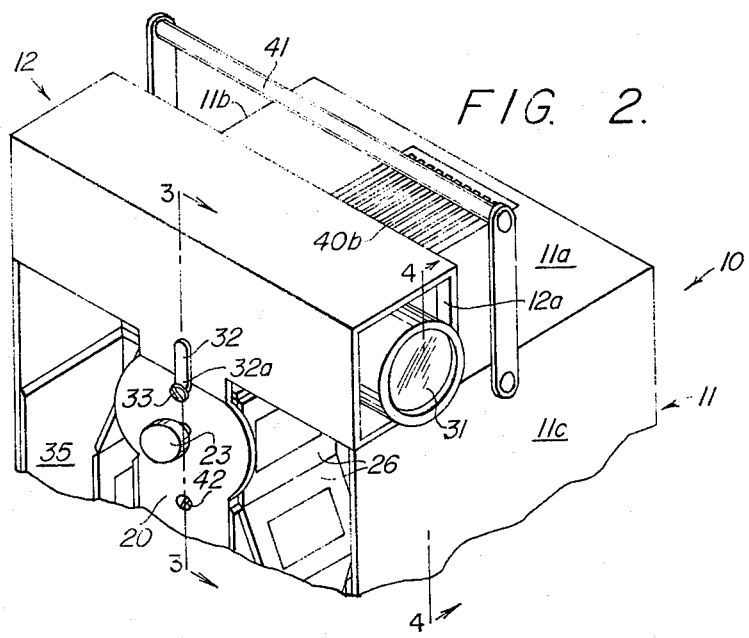

Referring now to the drawings:

In FIGS. 1 and 2, is shown, in profile perspective, a preferred embodiment of a projector 10. Shown therein, the projector is contained within a housing 11. To a top portion 11a of which housing 11 is connected a housing of a lens assembly hereinafter referred to as lens housing 12. The lens housing 12 is shown in FIG. 1, rotated around a hinge connection 13 with the top portion 11a, the lens housing rotated such that a side 12a thereof rests on the top portion 11a. In FIG. 2, the lens housing 12 is shown rotated to cover an opening 14 in the top portion 11a, between projector housing back and front walls 11b and 11c, respectively.

Figure 3:
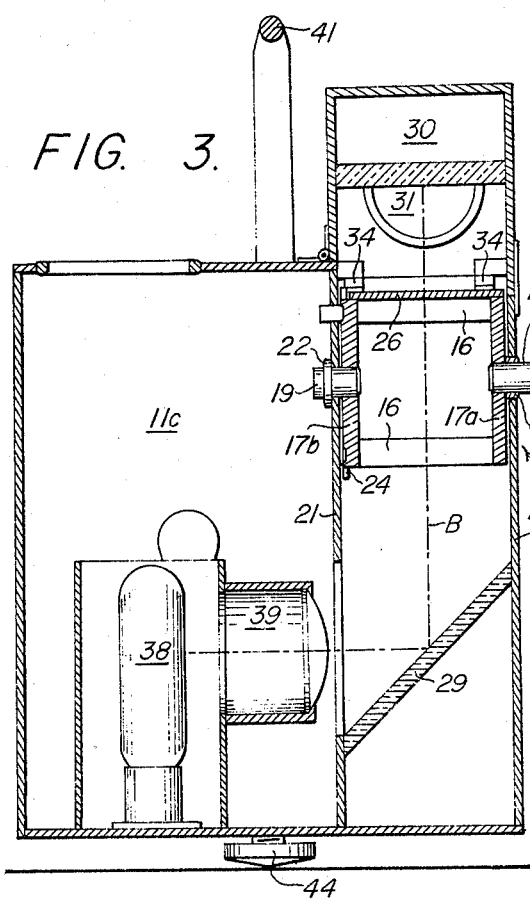

Within the opening 14, shown best in FIGS. 1 and 3, is shown a cage type slide mount feed mechanism 15 hereinafter referred to as cage 15. The cage 15, shown best in FIGS. 3 and 4 consists preferably of four struts 16 that each extend horizontally between corners of square front and rear side plates 17a and 17b. The square side plates 17a and 17b, FIG. 3, are, in turn, supported axially by front and rear posts 18 and 19, that extend through front and rear upright standards 20 and 21. Shown best in FIG. 3, both posts 18 and 19 are journaled through the respective standards 20 and 21 and are each maintained therethrough by locking rings 22. So arranged, manually turning a knob end 23, formed on the exposed end of the front post 18, rotates the cage 15. A tracking lug 24 extends outwardly from the mid point of each edge of the rear side plate 17b, for engaging an appropriate notch 25, FIG. 5, formed at a mid point in the edge of a slide mount 26 that is one of a train of slide mounts 27.

Shown in FIGS. 1 through 4, the train of slide mounts 27, are installed to the cage 15. The top side of the cage being the viewing area, a tracking lug 24 riding in a notch 25. So arranged, when the knob 23 is turned the tracking lug 24 will force the particular slide mount 26 forward until a tracking lug 24 on a following side of the rear side plate 17b engages the notch 25 in the following slide mount 26. Thereafter the following slide mount 26 moved by the cage 15, travels into and through the viewing area, and so on.

Figure 4:
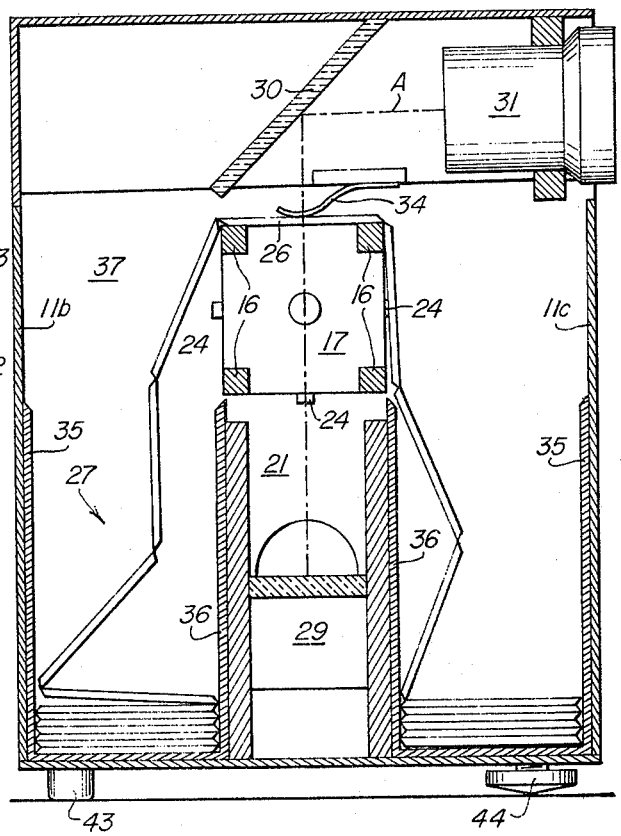
Figure 5:
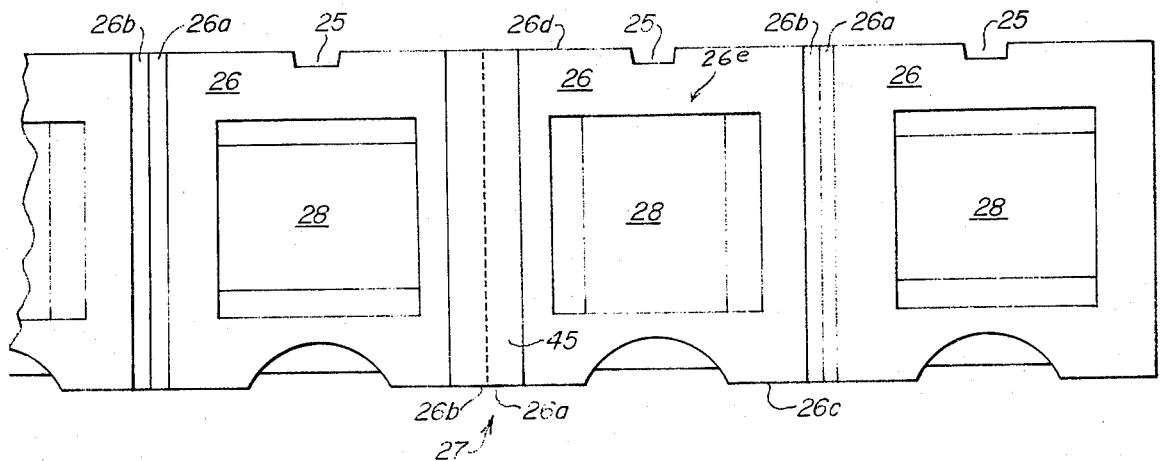

Between the front and rear standards 20 and 21, shown best in FIG. 4, is arranged a reflective mirror 29 that directs light received from a source within the housing up through the cage 15. The light source, preferably a projector lamp, is appropriately connected, not shown, to a source of electrical energy and appropriate switches, not shown, so as to provide light, when energized, that passes from the reflective mirror 29 and through a portion of a slide 28 that is fitted within the slide mount 26. Light reflected from the reflective mirror 29 passes, as shown by the broken line A in FIG. 4, through the one slide 28, is reflected off from a mirror 30 mounted in the lens housing 12, and passes, for focusing, into a lens 31. The lens 31, of course, receives a light representation of the image on the film portion of the slide 28, focusing that image onto a viewing surface, such as a screen, not shown.

The lens 31, as already mentioned herein, is arranged within the lens housing 12, protruding from an end thereof. The lens housing 12, as mentioned, is hinge connected at 13 to the top portion 11a of the projector housing 11, pivoting to the attitude shown in FIG. 2. In which FIG. 2, a fastener 32 is shown with an end 32a thereof fitted beneath the head of a screw 33 that projects outwardly from the top portion of the front standard 20. So arranged, the lens housing 12 is secured in an operating position, light passing through a slide 28 being reflected by mirror 30 and into the lens 31. In this attitude guides 34, that project from the undersurface of each side of the lens housing 12, engage a top face of a slide mount 26, along opposite edges thereof, maintaining the slide mount 26 snugly against the top side of the cage 15.

The arrangement and construction of the train of slide mounts will be explained in greater detail later herein, but should, for now, be understood to consist of a flexible coupling, in end to end relationship, of a number of slide mounts. That coupling arrangement providing opposite bending of the slide mounts 26 when the train is lowered vertically, effecting an automatic stacking of the slide mounts 26 after they have passed through the projector 10. As shown best in FIGS. 1 and 4, the train of slide mounts 27, preferably is arranged as a stack in one tray 35, feeding therefrom across the cage 15, into a second tray 35 by turning of the cage 15. The tracking lug 24 on each cage face, intersecting, and moving with in turn, each notch 25 in each slide mount 26. Each tray 35 is open on one face and at the top thereof, and is dimensioned appropriately to telescope snugly into either of two cavities within the projector 10 that are located between opposite faces of sides 36 that are secured between the edges of the front and rear upright standards 20 and 21 and the inner surfaces of projector housing back and front walls 11b and 11c. The trays 35 are therefore arranged to be capable of being removed and turned such that the back wall will face outwardly, for storage and travel with a train of slide mounts 27 installed therein, or to be reversed, the train exposed, as shown in FIGS. 1 through 4.

Shown best in FIGS. 1 and 4, a partition 37 is arranged to bisect the projector housing 11, extending vertically between the back and front walls 11b and 11c. The partition 37 separates the described tray 35 cavities, the front and rear upright standards 20 and 21, the reflection mirror 29, and cage 15, from the housing 11 interior. Within the housing 11 interior is contained, as shown best in FIG. 3, a light source, preferably a projector lamp 38, whose light passes through an opening 37a in partition 37, into reflective mirror 29, and thence into mirror 30, as shown by the broken line B. Also arranged within the housing 11 interior is a fan 39 that circulates an air flow over the projector lamp 38 during operation thereof. The fan 39 pulls air through a grated opening 40a in front wall 11c, over the projector lamp 38, and exhausting that air out from a vent 40b arranged in the housing top portion 11a, FIG. 2.

Both the projector lamp 38 and fan 39 should be understood to be standard readily available components that are hooked, through standard switches, to an electrical power source, with the fan connected so as to operate when the lamp 38 is illuminated. Of course, it should be readily apparent that, depending on the type of projector lamp 38 used and the amount of heat generated by operation thereof, the fan 39 may or may not be a necessary component of the invention.

Shown in a folded attitude in FIG. 1, and erected to a vertical attitude in FIG. 2, a folding handle 41 is preferably included as part of the invention to facilitate transport thereof. Shown in FIG. 1 a number of screws 42 are fitted into the front standard 20, to secure the sides 36, and reflective mirror 29 thereto.

Shown best in FIGS. 3 and 4, the projector 10 preferably rests on feet 43 located on the one edge of the bottom, and has an elevating screw 44 arranged on the opposite edge, which elevating screw can be turned and is raised or lowered thereby, to adjust the attitude of the projector lens 31 located above the elevating screw. It should of course, be understood that the lens 31 is capable of being moved inwardly or outwardly in the lens housing 12 as by turning, to change the focal length thereof so as to focus a projected image onto a screen, not shown.

Figure 6:
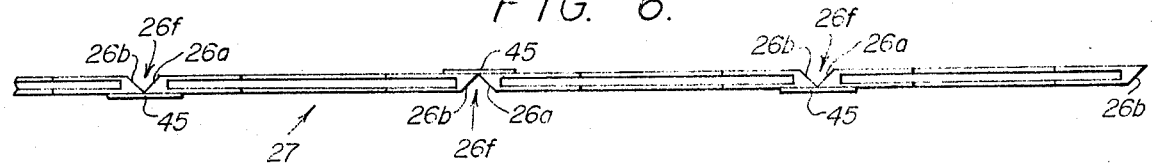

The train of slide mounts 27, as has already been mentioned herein, is made up of individual slide mounts 26 whose opposite edges 26a and 26b, FIG. 6, are camfered along opposite faces, the cuts made at the mount edges 26a and 26b being parallel to one another but on opposite faces thereof. Each slide mount 26 consists essentially of an envelope open along an exposed edge 26c, which edge is opposite to edge 26d wherein the notch 25 is formed at a mid point therein. In operation, the individual slide 28 is slid into the mount 26, through the opening along edge 26c, so as to align appropriately the film portion of the slide within an opening 26e in the slide mount 26. So arranged, light passing through the opening 26e passes unhindered through the slide film portion, that light shinning at different intensities through said film, projecting the image on that film for display on a screen surface, not shown.

Shown best in FIG. 6, the slide mounts 26 are preferably arranged in the train 27 by aligning the one camfered edge 26a with the camfered edge 26b of a second mount 26 and so on. The arrangement of which mounts 26, in end to end relationship, involves facing oppositely the adjacent mounts 26 such that a wide notch 26f is formed at the junction of the point of edge contact thereof, which adjacent notches 26f face oppositely to one another. So arranged, as shown best in FIG. 6, an adhesive strip 45 preferably tape, is applied to the edges of the mounts opposite to the face wherein is formed notch 26f, which adhesive strip provides a flexible coupling of the slide mounts 26 into the train of slide mounts 27. The opposite arrangement of which strips 45 and arrangement of notches 26f induce bending of the slide mounts back upon one another with the adhesive strips 46 folding back upon themselves. The slide mounts 26 thereby fold back and forth upon one another as the train of slide mounts 27 is lowered vertically onto a flat surface, such as the interior of tray 35, as shown in FIGS. 1 and 4.

While an adhesive strip 45 has been shown as a preferred arrangement for coupling the slide mounts 26 together, it should be obvious that another type of coupling could be substituted therefor without departing from the subject matter coming within the scope of this invention. Further, while the camfering of the slide mount edges 26a and 26b, and the resulting notch 26f formed thereby at the junction, is the preferred construction of the train of slide mounts 27, it should be obvious that the camfering and resultant notches could be dispensed with the slide mounts still folding back and forth upon one another as has been described, without departing from the subject matter coming within the scope of the present invention.

To load for operation the projector 10 of the present invention, an operator, not shown, first rotates the lens housing 12, as shown in FIG. 1, around the hinge connection 13. A top side of the cage 15 rotatably mounted between the front and rear standards 20 and 21 is thereby exposed. Thereafter, a first slide mount 26 in the train of slide mounts 27, stacked in tray 35 is manually elevated therefrom and is laid upon the cage 15 top side, a notch 25 therein fitted over a tracking lug 24 portion thereof. The tracking lug 24 projects outwardly from the cage 15. The projector housing 12 is thereafter lowered into the attitude shown in FIG. 2, and the fastener 32 is turned such that the end 32a thereof travels beneath the screw head 33, locking the projector housing 12 to the front standard 20, whereat, guides 34 arranged on opposite sides of the projector housing 12, and extending downwardly therefrom, engage the first slide mount 26, holding it against the side of the cage 15. Thereafter, manually turning the knob 23 in the direction away from the tray 35 containing the stacked train of slide mounts 27, the first slide mount 26 is moved from the cage 15 descending into the empty tray 35. Meanwhile, a tracking lug 24 on the following side of the cage 15 engages the notch 25 in the next slide mount 26 in the train. Continued turning of the knob 23 moves each slide mount 26 in the train 27, in turn, across the then top surface of the cage 15, exposing that slide mount, and the film portion of the slide 28 fitted therein, to light emitted from the projector lamp 38, which light is first reflected off from the reflective mirror 29 prior to passage through the slide 28.

Assuming that the projector 10 has been installed on a flat surface, the elevating screw 44 turned appropriately so as to raise or lower the lens 31 to aim it at a screen, not shown, and the train of slide mounts 27 loaded as described above, the projector lamp 38 is then illuminated by energizing a switch, not shown, to direct an electrically current thereto. So energizing the projector lamp 38 also energizes, or turns on, a fan 39 to force air over the illuminated lamp, providing a cooling thereof. Of course, depending upon the heat output of the projector lamp 38, the cooling effect of a fan may not be required, and the fan 39 could thereby be dispensed with. The fan 39 is, however, preferred as an inclusion with this invention.

Projector lamp 38 preferably operates at either high or low intensity, controlled by a switch, not shown, so that at low intensity the projector can be utilized for slide editing. Light emitted by the projector lamp 38, travels therefrom and is reflected by the reflective mirror 29, upwardly through the cage 15 and through the film portion of the slide 28 in the slide mount 26 arranged thereover. The light passing through the film of the slide picks up, as light and dark areas, the picture thereon, carrying that image presentation therefrom, into a mirror 30 that reflects the image into a lens 31. The lens 31 focuses that image and projects it into a viewing surface, such as a screen not shown, which lens can be moved appropriately in and out to adjust the focal length thereof to the distance between the lens opening and the viewing surface.

Although a preferred embodiment of my invention has been herein disclosed, it is to be understood that the present disclosure is made by way of example and that variations are possible without departing from the subject matter coming within the scope of the following claims, which subject matter I regard as my invention.

I claim:

1. A slide projector comprising:
  a housing;
  a lens means arranged with said housing for focusing and projecting an image onto a screen surface;
  a source of electrical energy;
  a light source arranged within said housing, passing light therefrom, when energized by said source of electrical energy, into said lens means;
  a cage slide mount feed mechanism having sides and arranged to be manually rotated in said housing, providing an unobstructed light passage therethrough when a side thereof is disposed between said light source and said lens means forming a viewing area, light from said light source passing therethrough and thence into said lens means;
  a train of slide mounts, each mount arranged to receive a slide therein, connected in end to end relationship so as to fold back and forth over one another into a stack when lowered vertically onto a flat surface; said mounts having their connected edges camfered on opposite faces thereof, and are connected one to another such that a "V" is formed at each connection with adjacent "V's" facing opposite to each other; and
  tracking lug means extending outwardly from each side of said cage slide mount feed mechanism for engaging sequentially each slide mount thereby moving said slide mount into and over the viewing area when said cage is rotated.

2. A slide projector as recited in claim 1 further including tray means for containing the stacked train of slide mounts therein and for receiving, in a stack, the train of slide mounts moved individually across the viewing area; and
  a fan means arranged in said housing so as to provide cooling of said light source.

3. A slide projector as recited in claim 1, wherein
  the lens means is arranged in a housing connected to the projector housing so as to be capable of rotation with respect thereto to move the lens housing away from the viewing area facilitating positioning of a slide mount thereover;
  means for locking the lens housing to the projector housing such that light passing through the slide in a slide mount enters the lens means; and
  guides arranged with said lens means housing, extending therefrom to engage the slide mount in the viewing area when the lens means housing is positioned to receive light into the lens means.

4. A slide projector as recited in claim 1 wherein
  the slide mounts are connected at their edges by installing an adhesive strip between said edges, on the face thereof opposite to said V.

5. A slide projector as recited in claim 1, wherein
  each slide mount is formed as an envelope having an opening arranged along one unconnected edge thereof to receive a slide fitted therein, which slide mount also has a central hole therethrough wherein the film portion of said slide is intended to be positioned; and
  the opening in each said mount is formed as a notch at a mid point in the edge of said mount opposite to said slide receiving opening, which notch just accommodates the tracking lug means passing therein.

* * * * *